United States Patent
Balachandran et al.

(10) Patent No.: US 8,027,290 B2
(45) Date of Patent: Sep. 27, 2011

(54) METHODS OF JOINTLY ASSIGNING RESOURCES IN A MULTI-CARRIER, MULTI-HOP WIRELESS COMMUNICATION SYSTEM

(75) Inventors: Krishna Balachandran, Morganville, NJ (US); Joseph H. Kang, Belle Mead, NJ (US); Kemal Mehmet Karakayali, Highland Park, NJ (US); Muralidharan Sampath Kodialam, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 783 days.

(21) Appl. No.: 11/812,146

(22) Filed: Jun. 15, 2007

(65) Prior Publication Data
US 2008/0310343 A1 Dec. 18, 2008

(51) Int. Cl.
*H04W 4/00* (2009.01)
(52) U.S. Cl. ........ 370/328; 370/255; 370/409; 370/248; 370/338; 370/395.41; 370/395.2; 370/230; 370/235; 455/561; 455/428; 455/445; 455/146; 455/225; 455/453; 455/452.1; 709/214; 709/239
(58) Field of Classification Search ............ 370/328, 370/255, 409, 248, 237, 338, 395.41, 395.2, 370/230, 235; 455/561, 428, 445, 146, 225; 455/453, 452.1; 709/241, 239
See application file for complete search history.

(56) References Cited

U.S. PATENT DOCUMENTS

| | | | |
|---|---|---|---|
| 6,493,317 B1 * | 12/2002 | Ma ................................ | 370/237 |
| 7,307,948 B2 * | 12/2007 | Infante et al. ................. | 370/225 |
| 2005/0007991 A1 | 1/2005 | Ton et al. | |
| 2005/0226214 A1 | 10/2005 | Keslassy et al. | |
| 2006/0067331 A1 | 3/2006 | Kodialam et al. | |
| 2006/0109787 A1 * | 5/2006 | Strutt et al. ................... | 370/235 |
| 2007/0025364 A1 * | 2/2007 | Kodialam et al. ............. | 370/400 |
| 2007/0111757 A1 * | 5/2007 | Cao et al. ....................... | 455/561 |
| 2007/0153702 A1 * | 7/2007 | Khan Alicherry et al. ... | 370/252 |
| 2008/0084827 A1 * | 4/2008 | Archer et al. ................. | 370/238 |

OTHER PUBLICATIONS

International Preliminary Report on Patentability dated Sep. 28, 2009.
Kemal Karakayali et al., "Cross-Layer Optimization for ORDMA-Based Wireless Mesh Backhaul Networks," WCNC 2007.
International Search Report dated Nov. 7, 2008 for corresponding International Application No. PCT/US2008/007341.
Written Opinion dated Nov. 7, 2008 for corresponding International Application No. PCT/US2008/007341.

* cited by examiner

*Primary Examiner* — Nimesh Patel
(74) *Attorney, Agent, or Firm* — Harness, Dickey & Pierce, PLC

(57) ABSTRACT

Methods for jointly determining tones, power, scheduling and routing of links in a multi-carrier, multi-hop network to achieve certain desired throughput objectives between source and destination nodes. The methods effectively enhance or optimize throughput received by each destination router under node traffic constraints such as power, scheduling and flow constraints that apply to each link between each of a plurality of nodes within the mesh network.

18 Claims, 12 Drawing Sheets

METHODS OF JOINTLY ASSIGNING RESOURCES IN A MULTI-CARRIER, MULTI-HOP WIRELESS COMMUNICATION SYSTEM

BACKGROUND OF THE INVENTION

1. Field of the Invention

Example embodiments relate to communication systems, for example, methods of jointly assigning resources in multi-hop wireless communication systems.

2. Description of the Related Art

Orthogonal Frequency Division Multiple Access (OFDMA) has been adopted as the multiple access technique for many wireless communication systems, including systems that operate according to the Institute of Electrical and Electronics Engineers (IEEE) 802.16e standard (also known as WiMAX), Universal Mobile Telecommunications System-Long Term Evolution (UMTS-LTE), which is currently being standardized by the Third Generation Partnership Project (3GPP), and High Rate Packet Data Revision C, which is currently being standardized by the Third Generation Partnership Project 2 (3GPP2).

In a conventional OFDMA system, available bandwidth is divided into a plurality of subcarrier frequencies (commonly referred to as bands, tones, or subcarriers, and used interchangeably as such herein) and time is segmented into symbols. One or more subcarriers, adjacent or distributed over the frequency band, may be grouped into subchannels. Moreover, one or more symbols may be grouped into time slots, and the time slots may be grouped into frames. Typically, a base station is responsible for assigning resource units across time and frequency for all single-hop communication links between the base station and subscriber stations, between base stations and relay stations or between base stations and base stations. A single-hop refers to a direct communication link between two network nodes without an intermediate node helping the communication, whereas multi-hop refers to communication between two network nodes in which the transmitted data is routed through intermediate nodes. Such links may be unidirectional or bi-directional in nature. To achieve higher system throughputs, resources may be assigned based on channel quality information, which may vary across time, frequency and/or space. Better channel quality typically yields higher throughputs.

In a conventional wireless communications network, base stations assign resources locally. That is, for example, base stations assign resources only for links that originate or terminate at the base station. Resource assignment decisions are based on channel quality information on these local links. Further, resource decisions spanning power, tone allocation, scheduling and routing are conventionally performed independently to reduce complexity (e.g., layering). Doing so, however, may significantly reduce system performance.

SUMMARY OF THE INVENTION

Example embodiments provide methods for jointly determining tones/subchannels, power, scheduling and/or routing of all links in a multi-carrier, multi-hop network to achieve certain desired throughput objectives between source and destination nodes. Example embodiments may enhance or optimize throughput received by each destination router under link routing constraints such as power, scheduling and flow constraints that apply to each link between each of a plurality of nodes within the mesh network.

At least one example embodiment provides a method for transmitting data between a plurality of nodes in a wireless network. The plurality of nodes may be interconnected via a plurality of wireless links. In this method, at least one link routing characteristic for transmitting data between at least two of the plurality of nodes may be determined based on at least one desired data throughput characteristic for each source/destination pair selected from the plurality of nodes and a set of link routing constraints associated with the plurality of nodes. Data may be transmitted between the plurality of nodes in accordance with the at least one link routing characteristic.

According to at least some example embodiments, the set of link routing constraints associated with the plurality of nodes may be established based on the at least one data throughput characteristic. The at least one link routing characteristic may include at least one of a number of tones allocated to the plurality of wireless links, a transmission power associated with each of the tones, routing paths for each source/destination pair and an amount of source/destination traffic transmitted via each routing path.

According to at least some example embodiments, at least one of a plurality of tones to each of the plurality of wireless links may be determined based on the at least one data throughput characteristic. At least one tone may be assigned to each of the plurality of wireless links based on a signal to interference plus noise ratio associated with the plurality of wireless links. Transmission power may be allocated to each of the allocated tones based on the at least one data throughput characteristic and a power constraint associated with each of the plurality of nodes. The set of link routing constraints include at least one of routing, media access and physical layer constraints.

According to at least some example embodiments, a set of link schedules corresponding to the determined at least one link routing characteristic may be selected to achieve the desired data throughput characteristic. The data may be transmitted based on the selected link schedules. The desired data throughput characteristic may be a net traffic flow at each of the plurality of nodes. Routing paths for routing the transmitted data may be determined based on the selected link schedules and at least one link routing constraint. The data may be transmitted via the determined routing paths. The at least one link routing constraint may be a per node average sum power constraint indicative of a length of time for which a node in the plurality of nodes transmits on one of a plurality of tones on one of the plurality of wireless links.

According to at least some example embodiments, a set of aggregate flows for transmitting the data may be determined based on the at least one link routing constraint and the desired data throughput characteristic. The desired data throughput characteristic may be a desired incoming traffic flow to each destination node. The data may be transmitted in accordance with the set of aggregate flows. The set of aggregate flows may be determined such that the traffic generated by each source node in the plurality of nodes is greater than or equal to the net throughput delivered to each destination node in the plurality of nodes.

According to at least some example embodiments, a link capacity may be assigned to each of the plurality of wireless links based on a set of allocated transmission powers. The transmission powers may be allocated based on the at least one desired throughput characteristic. The at least one link routing characteristic may be determined based on the assigned link capacity.

According to at least some example embodiments, a set of aggregate flows for transmitting the data may be determined based on a sum rate metric associated with each destination node. The sum rate metric may be indicative of the total traffic flow to the associated destination node. The data may be transmitted in accordance with the set of aggregate flows.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
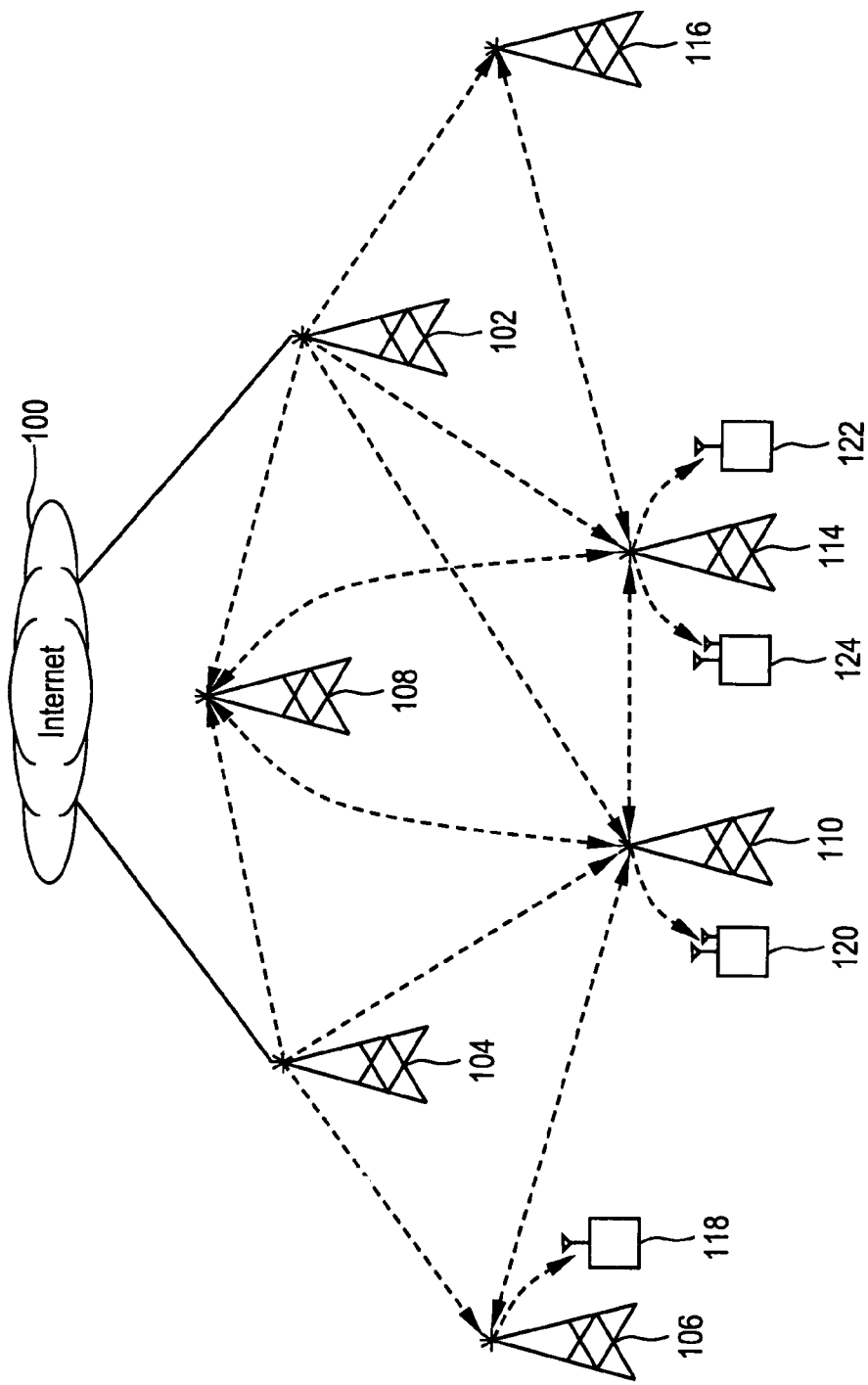
FIG. 1 illustrates an example network architecture in which example embodiments may be implemented.

Although the principles of example embodiments may be particularly well-suited for wireless communication systems based on fourth generation (4G) wireless communication systems such as 802.16e, 802.16m, WiMax, and EV-DO Revision C and may be described in this example context, these example embodiments are meant to be illustrative only and not limiting in any way. Example embodiments may also be applicable to other radio networks. As such, various modifications will be apparent to those skilled in the art for application to other wireless communication systems and are contemplated by the teachings herein.

Where used below, the term "gateway access point" refers to a network node inter-connected with other network nodes via multi-carrier or orthogonal frequency division multiple access (OFDMA)-based radio links, and connected to a "high bandwidth" wired or backhaul network. A gateway access point may be considered synonymous to, and may hereafter be occasionally referred to as a gateway, a base station with gateway functionality or a source node.

Where used below, the term "mesh router" refers to network nodes inter-connected using multi-carrier or orthogonal frequency division multiple access (OFDMA)-based radio links and having traffic routing capabilities. Mesh routers may be considered synonymous to, and may hereafter be occasionally referred to access points or sink nodes.

According to example embodiments, gateway access points may function as traffic sources (downlink), and mesh routers may receive traffic from the gateway access points, for example, via multi-hop routing through intermediate nodes, for example, other mesh routers.

Where used below, the term "mobile terminal" may be considered synonymous to, and may hereafter be occasionally referred to as mobile station, mobile, mobile user, user equipment (UE), subscriber, user, remote station, access terminal, receiver, mesh client, etc., and may describe a remote user of wireless resources in a wireless communication network.

As described herein, a network element or node may refer to any or all of a gateway access points, mesh router and mobile terminal, and the term "base station router" may refer to one or more of a gateway access point and a mesh router. In some example embodiments, gateway access points and mesh routers may be located at fixed or static base stations.

For the purposes of this discussion, the term "network" may refer to one or more base station routers and mobile terminals. That is, for example, a "network" as discussed herein may refer to a single base station router and mobile terminal, hundreds of base station routers and mobile terminals, thousands of base station routers and mobile terminals, etc.

In general, example embodiments may be directed to methods of jointly assigning resources in a multi-carrier, multi-hop wireless communication system. Example embodiments provide a cross-layer optimization framework for the aforementioned wireless mesh capable of jointly determining power control, frequency-selective OFDMA scheduling and multi-hop routing to achieve certain rate maximization objectives.

Methods according to at least some example embodiments may be performed by a unit referred to as a central resource allocator unit. The central resource allocator unit may be functionally co-located with a base station, mesh router, gateway access point or may be a separate entity within the network that may communicate signaling information to a plurality of base stations, mesh routers and/or gateway access points. As discussed herein, links for which the cross-layer optimization may be performed include one or more of gateway access point to gateway access point links, gateway access point to mesh router links, gateway access point to mobile terminal links, mesh router to mesh router links, mesh router to mobile terminal links, etc.

FIG. 1 shows a wireless mesh network including of a set of gateway access points connected to a wired network. Referring to FIG. 1, the mesh network may include gateway access points 102 and 104 with wire line connectivity (indicated with solid black lines) to the Internet 100 and mesh routers 106, 108, 110, 114 and 116 with wireless links (indicated with dashed lines) to the gateway access points 102 and 104, mobile terminals 118-124, and other mesh routers.

Figure 2:
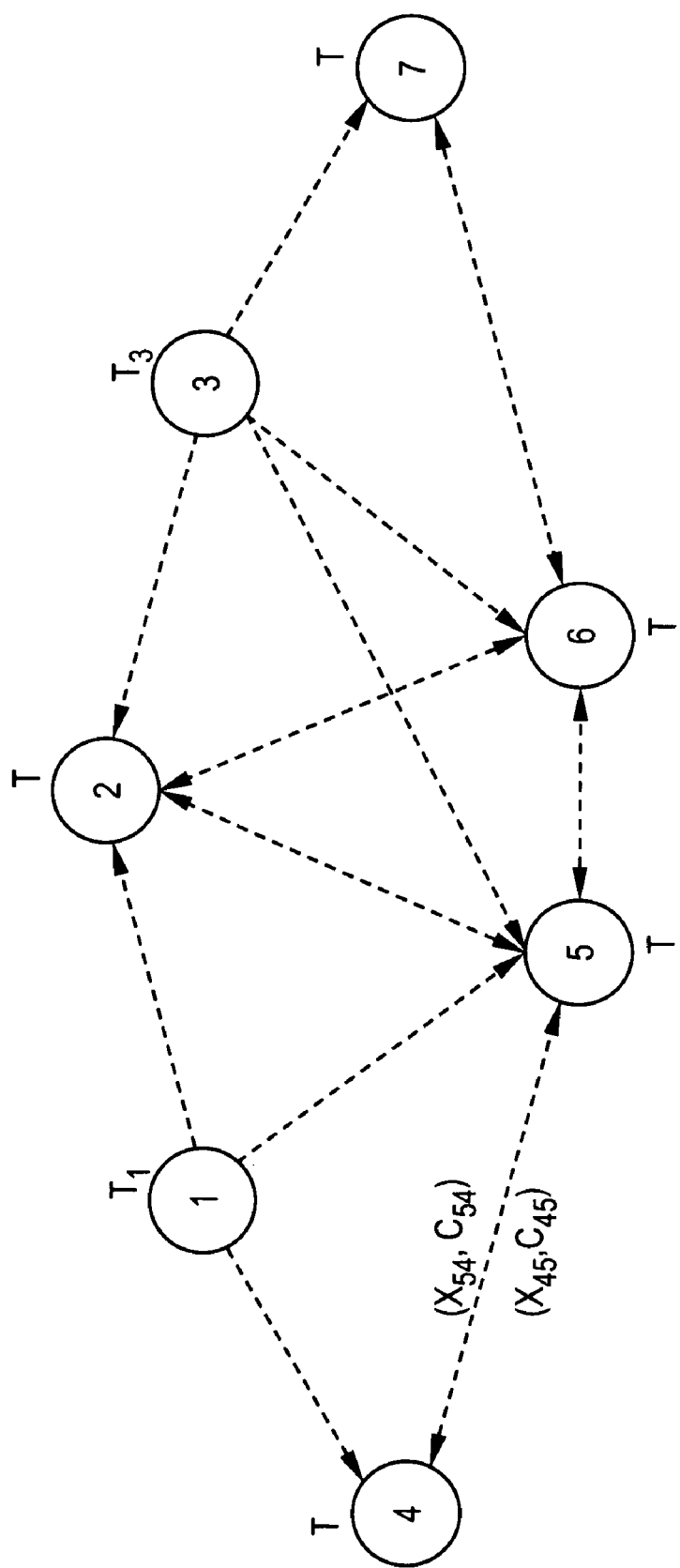
FIG. 2 is a directed graph corresponding to the example network architecture shown in FIG. 1.

The mesh network shown in FIG. 1 may be mapped onto a directed graph G=(M,A) as shown in FIG. 2, which includes a set of nodes M and a set of links or source/destination pairs A. The set of nodes M may be given by M={1,2,3,4,5,6,7} and the set of links may be given by A={(1,2), (1,4), (1,5), (2,5), (2,6), (3,2), (3,5), (3,6), (3,7), (4,5), (5,2), (5,4), (5,6), (6,2), (6,5), (6,7), (7,6)}. The set of nodes M and/or the set of links A may be selected from a plurality of nodes in a network based on traffic characteristics, such as, destinations of incoming data, amount of incoming traffic, etc. Referring to FIGS. 1 and 2, the mesh routers 106, 108, 110, 114 and 116 in FIG. 1 may correspond to nodes 4, 2, 5, 6 and 7, respectively, and gateway access points 102 and 104 may correspond to nodes 1 and 3, respectively.

Referring to FIG. 2, $C_{ij}$ (e.g., $C_{54}$ and $C_{45}$) represents an achievable rate on a link (i,j) between the $i^{th}$ and the $j^{th}$ node in the network, and $x_{ij}$ represents the amount of flow on link (i,j) between the $i^{th}$ and $j^{th}$ node. That is, for example, the amount of data traffic carried by a link between the $i^{th}$ and $j^{th}$ node at a given time. According to at least some example embodiments, $x_{ij}^f = a_{ij}^f$ where $a_{ij}^f$ may contain traffic for multiple destination nodes (e.g., mesh routers, mobile terminals, etc.), and at least a portion of $a_{ij}^f$ may belong to a destination node d. The achievable rate on a link may also be referred to as the "link capacity."

Because gateway access points are considered traffic sources, each of nodes 1 and 3 in FIG. 2 may be referred to as a source node with a supply of $T_i$ bits/sec, where $T_i$ represents the total amount of traffic entering the network through the source node i (where i=1 and 3 in FIG. 2) to be distributed to mesh clients (e.g., mobile terminals not shown in FIG. 2) located in the service areas of the mesh routers (or sink nodes). As discussed above, sink nodes may be capable of routing traffic destined for the other nodes. For each sink node, the net incoming flow is assumed to be T bits/sec. More generally, the net incoming flow destined for the $j^{th}$ sink node may be represented by $T^j$. The special case where $T^j = T$ for each node j corresponds to a common rate solution and the achievable rate may be limited by the worst "bottleneck" node.

For a network with N nodes, the maximum number of links in a directed graph representation is $|D|=N^*(N-1)-N_s^*(N-1)=(N-N_s)^*(N-1)$ where $N_s$ denotes the number of source nodes, $N^*(N-1)$ is the number of possible two-way links between node pairs and the term $N_s^*(N-1)$ deletes the incoming links into the sources (e.g., no backward traffic). In FIG. 2, the maximum number of links in a directed graph representation is $|D|=7^*(6)-2^*(6)=(5)^*(6)=30$.

For the purposes of explanation, the set M is assumed to be divided into two subsets $M=M_{so} \cup M_{si}$, where $M_{so}$ is a set of source nodes and $M_{si}$ is a set of sink nodes. As noted above, in FIG. 2, $M_{so}=\{1,3\}$ and $M_{si}=\{2,4,5,6,7\}$.

Each sink node in set $M_{si}$ has access to L channels of bandwidth W Hz each. The existence of multiple orthogonal channels may be accounted for by assuming L distinct links between node pairs. In other words, assuming that each of the $1^{st}, 2^{nd}, \ldots$, L-th channels has a bandwidth of $W_1, W_2, \ldots, W_L$ Hz, respectively, and constitutes a single link. For the purposes of explanation, a superscript f denotes each of these channels. That is, for example, $x_{ij}^f$ denotes the flow on the f-th channel between nodes i and j.

The achievable rate or link capacity $C_{ij}^f$ on the f-th channel may be determined based on channel characteristics for the f-th channel including, for example, channel bandwidth, transmission power for the f-th channel and channel conditions for the f-th channel. That is, for example, the achievable rate $C_{ij}^f$ on the f-th channel may be computed using Equation (1) shown below.

$$C_{ij}^f = W^* \log 2(1+\rho_{ij}^f) \text{ bits/sec} \quad (1)$$

In Equation (1), $\rho_{ij}^f$ represents the received signal-to-interference-plus-noise ratio (SINR) on the f-th channel and may be equal to $\rho_{ij}^f = p_{ij}^f * h_{ij}^f$. In this example, $p_{ij}^f$ represents the power transmitted on the f-th channel, and $h_{ij}^f$ represents the channel conditions (e.g., path loss, channel attenuation due to fading, interference, thermal noise, etc.). Although not discussed herein for the sake of brevity, the achievable rate on the f-th channel $C_{ij}^f$ may be determined according to other methods based on $p_{ij}^f$ and $h_{ij}^f$ (e.g., such as modulation and coding scheme look-up tables) and $h_{ij}^f$ may be estimated by the base station and/or computed by the mobile terminal and signaled to a base station in any well-known manner.

Figure 3:
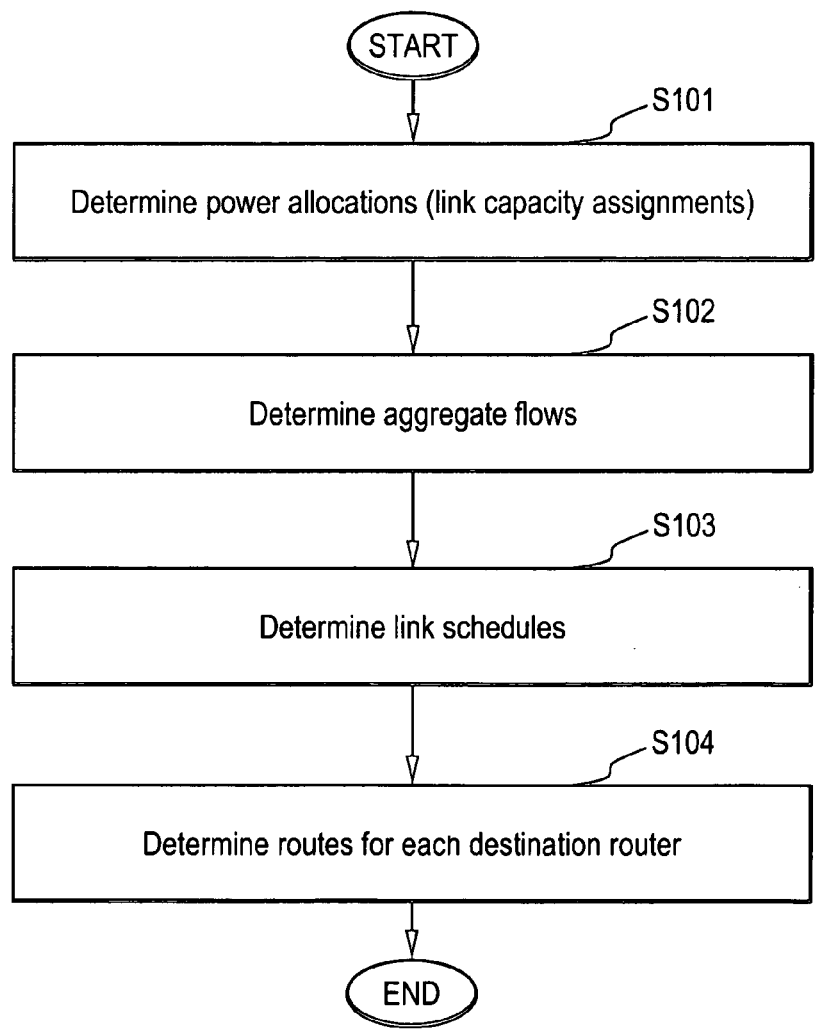
FIG. 3 is a flow chart illustrating a method according to an example embodiment.

FIG. 3 is a flow chart illustrating a method according to an example embodiment. For the sake of clarity, steps S101 and S102 of the method shown in FIG. 3 will be described with regard to the directed graph shown in FIG. 2. However, the method of FIG. 3 may be applicable to any other network.

The method of FIG. 3 may be used to determine at least one link routing characteristic (e.g., link capacity, aggregate flows, link schedules and/or routing paths) for transmitting data between at least two of the plurality of nodes based on at least one desired data throughput characteristic for each source-destination pair selected from the plurality of nodes and a set of link routing constraints (e.g., Equations (2)-(7) shown below) associated with the plurality of nodes.

Referring to FIG. 3, at step S101, the transmission power $p_{ij}^f$ may be allocated for each of the f channels and all links in the set A (e.g., this may be referred to as the link capacity assignment step). That is, for example, at step S101, the transmission power $p_{ij}^f$ for each of f channels on links in the set A={(1,2), (1,4), (1,5), (2,5), (2,6), (3,2), (3,5), (3,6), (3,7), (4,5), (5,2), (5,4), (5,6), (6,2), (6,5), (6,7), (7,6)} may be determined. The transmission power $p_{ij}^f$ for each of the f channels may be determined on links in the set A, and an achievable rate $C_{ij}^f$ may be determined for each of the f channels in links between each of the plurality of nodes in the network. Collectively, this may also be referred to as assigning link capacity.

In one example, link capacity may be assigned using uniform power allocation. That is, for example, transmission power may be allocated using uniform power allocation. As is well-known in the art, in this example $p_{ij}^f$ may be set uniformly according to a maximum power constraint P, which may be a given network parameter. Because uniform power allocation is well-known in the art, a detailed discussion will be omitted for the sake of brevity.

In another example, link capacity may be assigned using spatial water-filling. This example will be described in more detail with regard to the example network topology shown in FIG. 4.

Figure 4:
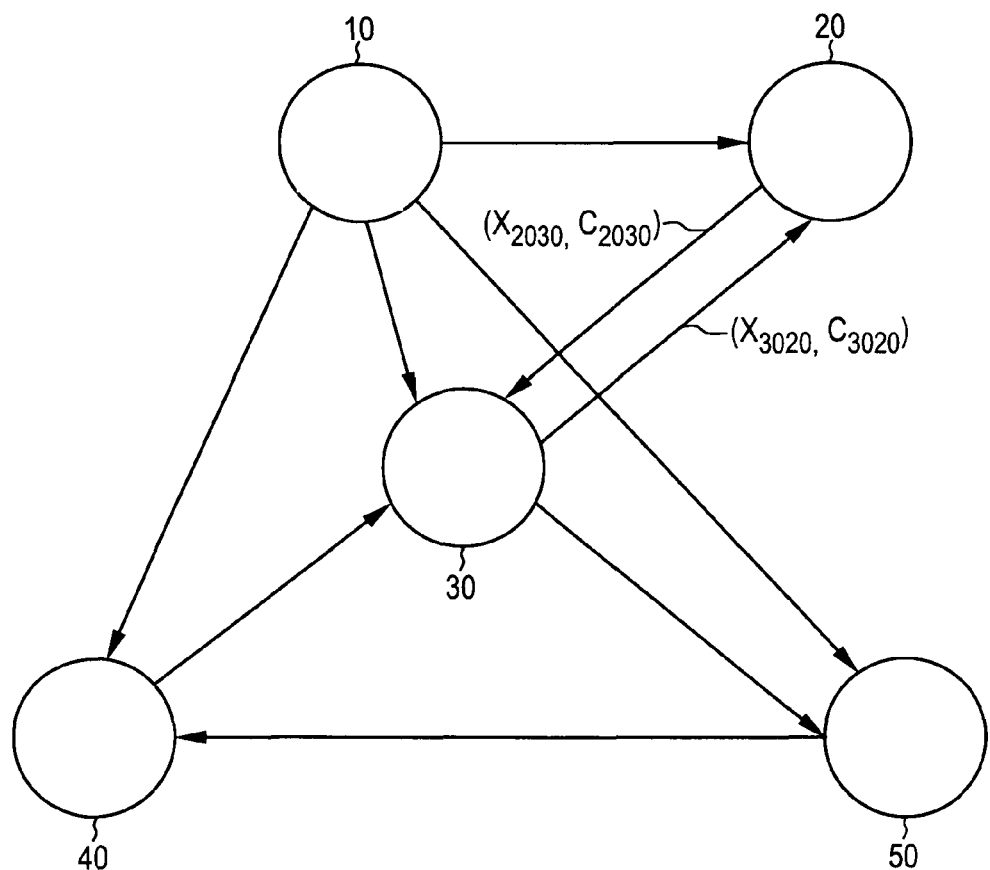
FIG. 4 illustrates a sample network topology in which example embodiments may be implemented.

Referring to FIG. 4, the set of outgoing links from node i is assumed to be Aout(i). Referring to FIG. 4, Aout(10)={(10; 20); (10; 30); (10; 40); (10; 50)}. For each of the node pairs in the set Aout(i), there are L available channels (also referred to as sub-carriers or tones). In this example embodiment, spatial water-filling distributes the available transmit power for the $i^{th}$ node across the pairs in Aout(i) for all L tones. According to at least one (e.g., applicable) scheduling constraint(s) described below, each tone may only be active on a single link at a time, and thus, a single link may be selected for each tone. To enhance or maximize the total rate out of a particular node, each tone may be assigned to a corresponding link having the highest signal to interference plus noise ratio (SINR) on that tone.

In yet another example, link capacity may be assigned using random link assignments with water-filling. Assuming still that the set of outgoing links from the $i^{th}$ node i is Aout(i), each tone may be assigned to a link, which may be randomly selected from the set Aout(i) and the total node transmit power may be allocated by water-filling across these randomly selected link/tone pairs. Random link assignments may improve network connectivity relative to spatial water-filling, but may not improve and/or maximize spectral efficiency.

Link capacity may also be assigned using link-based water-filling. In this example, link-based water-filling provides a compromise between the two above-discussed water-filling approaches. With link-based water-filling, each source/destination pair is considered separately and each pair has a non-zero capacity to help ensure better network connectivity relative to spatial water-filling. In addition, power allocation based on water-filling may yield higher rates for tones with sufficient or good channel conditions and consequently may improve rates generated by optimization. When the water-filling is performed on each pair, the power level may be assumed to be the node transmission power constraint P. While this may result in a total node transmission power of NP if all the outgoing links/tones to N neighbors are simultaneously active. Because each tone is scheduled to be active at only one of the N links, approximately 1/Nth of NP is actually utilized and the average node transmit power may be about P. Further, these are only preliminary heuristic power assignments to generate link capacities and the average node power constraint used in a later step of the optimization may guarantee that an average power constraint is met.

After having assigned link capacity at step S101, at step S102, a linear program may be used to determine aggregate flows $x_{ij}^f$ for the f channels on the links (e.g., valid combinations of i and j) in the network using at least one of the link routing constraints shown below in Equations (2)-(7).

$$\sum_{(i,j) \in A_{out}(i)} \frac{x_{ij}^f}{C_{ij}^f} + \sum_{(j,i) \in A_{in}(i)} \frac{x_{ji}^f}{C_{ji}^f} \leq \beta, \forall i \in M, \forall f \quad (2)$$

In Equation (2), $A_{out}(i)$ and $A_{in}(i)$ are the set of outgoing and incoming links, respectively, for the $i^{th}$ node, and $C_{ij}^f$ is the achievable rate on the f-th channel of the link between the $i^{th}$ and the $j^{th}$ node. The link routing constraint given by Equation (2) is an example media access (e.g., a MAC) constraint. If the constraint in Equation (2) is met, a feasible link scheduling policy supporting a net flow of $x_{ij}^f$ exists when nodes in the network are operating at half-duplex (e.g., cannot simultaneously receive and transmit on the same channel f) and multiple nodes do not simultaneously transmit to the same node on the same channel f. The constant $\beta = 2/3$ and $\beta = 1$ represent sufficient and necessary conditions, respectively, to achieve a feasible link scheduling policy.

Another link routing constraint is given by Equation (3) shown below. The constraint shown in Equation (3) enforces a per node average sum power constraint in which $x_{ij}^f/C_{ij}^f$ represents the fraction of time that the $i^{th}$ node transmits on channel f, while the remaining term represents the power needed to achieve a rate of $C_{ij}^f$.

$$\sum_{(i,j) \in A_{out}(i)} \sum_{\forall f} \frac{x_{ij}^f}{C_{ij}^f} \frac{2^{C_{ij}^f/w} - 1}{h_{ij}^f} \leq P, \forall i \in M \quad (3)$$

The second term in Equation (3) is equivalent to $p_{ij}^f$ given Equation (1) shown above. If a different derivation of $C_{ij}^f$ as a function of $p_{ij}^f$ is employed, the second term in the product is modified accordingly. The link routing constraint given by Equation (3) is an example of a physical layer constraint.

The link routing constraints shown below in Equations (4)-(7) are traffic flow constraints for determining the amount of traffic distributed through source nodes (Equation (4)), suppressing and/or preventing backward traffic into source nodes (Equation (5)), determining the amount of traffic received at the sink nodes (Equation (6)) and ensuring total traffic from the source nodes matches the sum of traffic received by destination sink nodes (Equation (7)).

$$\sum_{(i,j) \in A_{out}(i)} \sum_{\forall f} x_{ij}^f = T_i, \forall i \in M_{so} \quad (4)$$

$$\sum_{(j,i) \in A_{in}(i)} \sum_{\forall f} x_{ji}^f = 0, \forall i \in M_{so} \quad (5)$$

$$\sum_{(j,i) \in A_{in}(i)} \sum_{\forall f} x_{ji}^f - \sum_{(i,j) \in A_{out}(i)} \sum_{\forall f} x_{ij}^f = T, \forall i \in M_{si} \quad (6)$$

$$\sum_{i \in M_{so}} T_i = \sum_{i \in M_{si}} T \quad (7)$$

The link routing constraints given by Equations (4)-(7) are examples of net flow routing or routing constraints.

According to example embodiments, the set of aggregate flows $x_{ij}^f$ that maximize T subject to the link routing constraints of Equations (2)-(7) may improve, enhance and/or maximize incoming traffic T to each destination sink node. With each $C_{ij}^f$ determined at step S101, Equations (2)-(7) are linear with regard to $x_{ij}^f$ and the set of aggregate flows $x_{ij}^f$ may be determined using a linear program.

Returning to FIG. 3, after determining the aggregate flows $x_{ij}^f$ at step S102, at step S103, a set of link schedules corresponding to the aggregate flows $x_{ij}^f$ and achieving at least one desired data throughput characteristic (e.g., a desired traffic flow to each sink node) may be selected from a plurality of candidate link schedules. As discussed above, Equation (2) guarantees the feasibility of scheduling.

Figure 5:
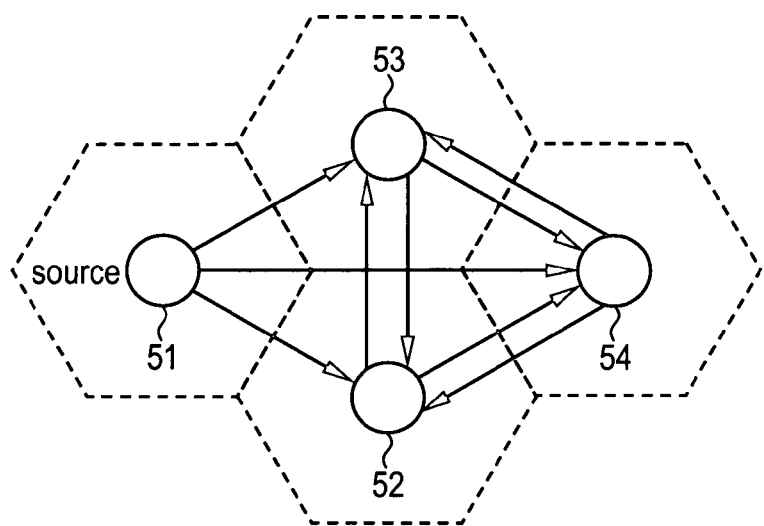
FIG. 5 illustrates another example network in which example embodiments may be implemented.
Figure 6:
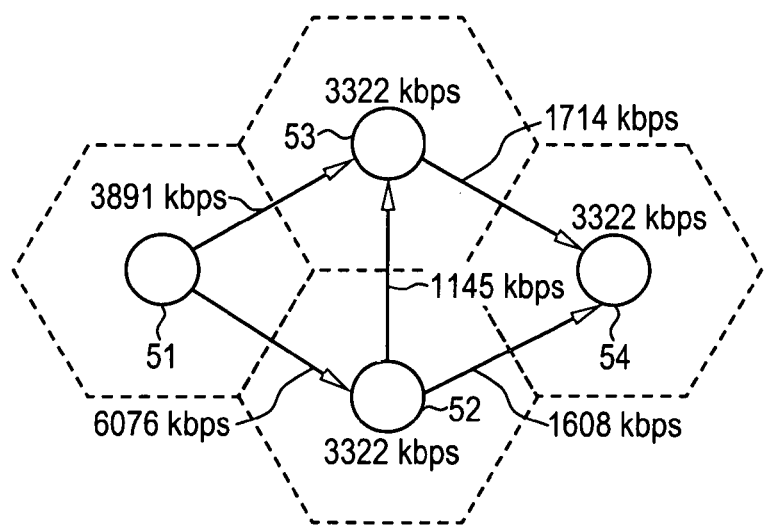
FIG. 6 shows example aggregate flows for which feasible link schedules may be selected.

According to at least some example embodiments, the set of link schedules may be selected based on the assigned link capacities and aggregate flows. Step S103 shown in FIG. 3 will be described by way of example with regard to the example network shown in FIGS. 5 and 6. In FIGS. 5 and 6, node 51 is a source node, and nodes 52-54 are sink nodes.

As described above, for a network with N nodes, the maximum number of links possible in a directed graph representation is $|D|=N*(N-1)-N_s*(N-1)=(N-N_s)*(N-1)$ where $N_s$ denotes the number of source nodes, $N*(N-1)$ is the number of possible two-way links between node pairs and the term $N_s*(N-1)$ deletes the incoming links into the sources (e.g., no backward traffic). For the sample network shown in FIGS. 5 and 6, the number of links is $|D|=4*(4-1)-1*(4-1)=9$.

Out of these $|D|$ links, only those links that do not violate the link routing constraint given by Equation (2) (e.g., each node may be connected to one outgoing or incoming link) may be selected. A set of links permitted to be active simultaneously may be referred to as a "mode". A set of link schedules may include one or more modes.

According to example embodiments, an active mode and a duration of time for which the each mode is active may be used to achieve desired data throughput characteristics or desired flow requirements. With $|D|$ links present in the network, there are $2^{|D|}$ subsets of links possible, but only those satisfying the link routing constraint given by Equation (2) may be considered candidate modes. For wireless backhaul applications, network topology is relatively fixed and therefore available modes may be determined off-line, for example, through exhaustive search methods for reasonable network sizes. Alternatively, heuristic graph-coloring algorithms that generate feasible modes in polynomial time may be used for any network sizes. Several of these algorithms such as the greedy graph-coloring algorithm are well-known in the art, and thus, a detailed discussion has been omitted for the sake of brevity. For the purposes of this discussion, the feasible modes are assumed to be generated either through an exhaustive search or using any well-known heuristic algorithm.

Figure 7:
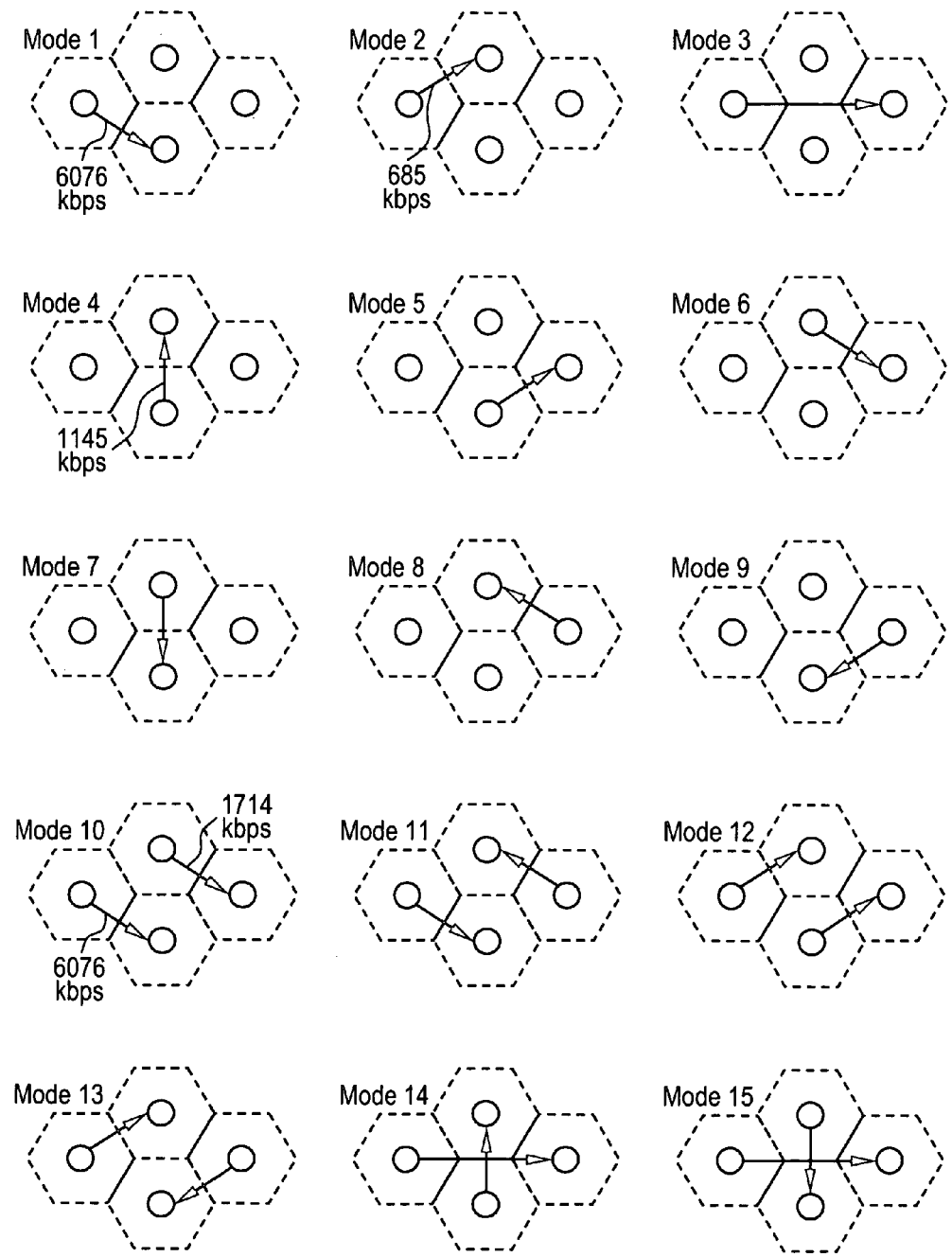
FIG. 7 illustrates a feasible mode selection schedule according to an example embodiment.
Figure 8:
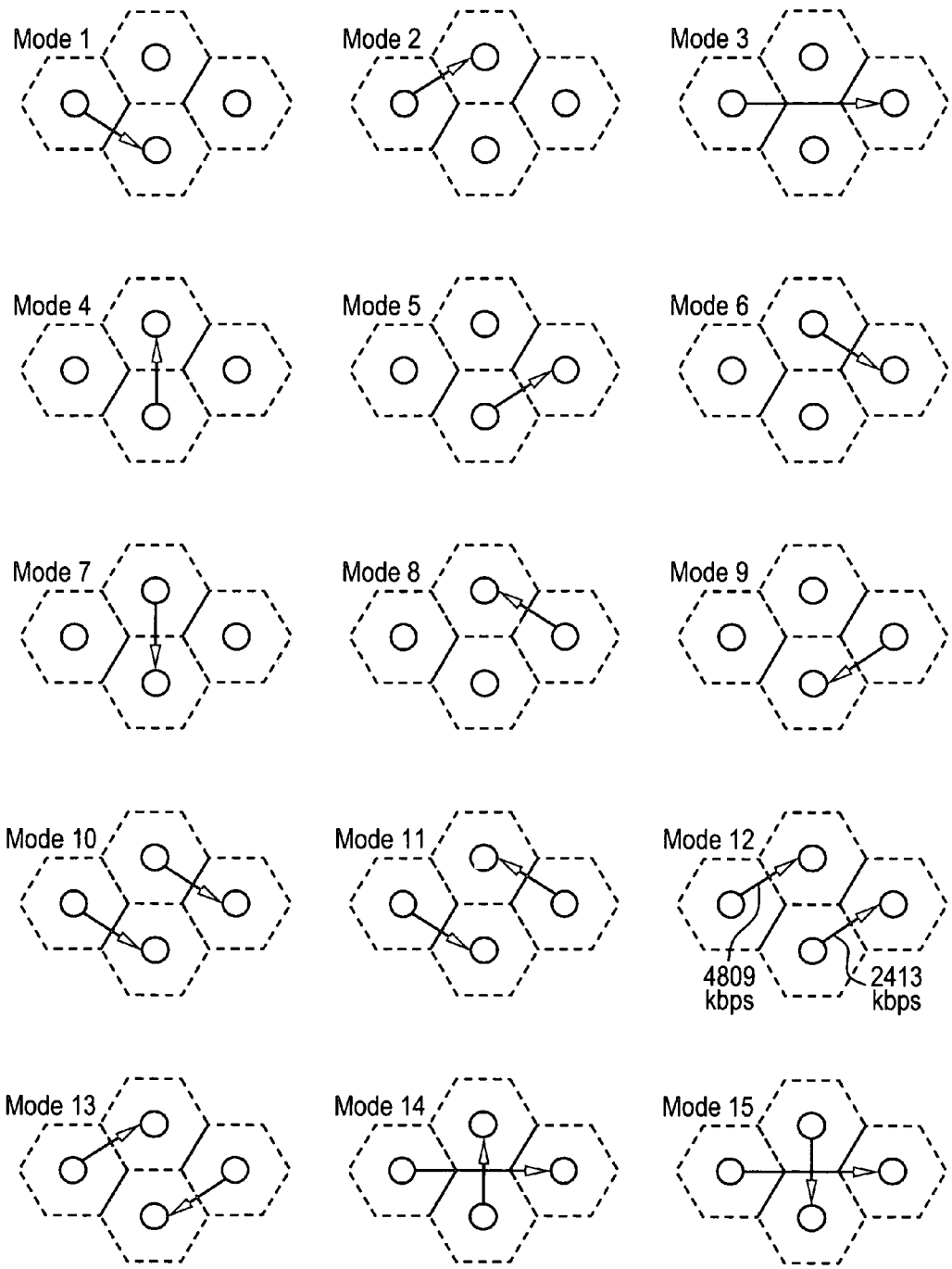
FIG. 8 illustrates another feasible mode selection schedule according to an example embodiment.

For the sample network in FIGS. 5 and 6, candidate modes for each of channels 1 and 2 (shown in FIGS. 7 and 8, respectively) are determined through an exhaustive search. In this example, there are 15 candidate modes for each of Channel 1 and Channel 2. The percentage of time each mode should be active may be calculated as follows.

Let $\alpha_k$ denote the percentage of time mode k is active and let $c^k = [c_{5152}{}^k, c_{5153}{}^k, c_{5154}{}^k, c_{5253}{}^k, c_{5254}{}^k, c_{5352}{}^k, c_{5354}{}^k, c_{5452}{}^k, c_{5453}{}^k]$ denote the capacity vector for the mode k where $c_{ij}{}^k = c_{ij}$ when the link between node i and node j is included in the mode k, and $c_{ij}{}^k = 0$ otherwise. To satisfy flow requirements, $$x_{ij} \le \sum_k \alpha_k c_{ij}^k$$

must be satisfied. In this example, the following linear program (LP-1) solves for the necessary time fractions for which each mode is active.

$$\text{find } [\alpha_k] \text{ (or min} 0 \times [\alpha_k]) \quad \text{(LP-1)}$$
$$x_{ij} \le \sum_k \alpha_k c_{ij}^k$$
$$\sum_k \alpha_k \le 1$$
$$\alpha_k \ge 0, \forall k$$

To provide desired data throughput characteristics (e.g., satisfy rate requirements) between nodes in FIG. 6, a set of modes may be selected for each of Channels 1 and 2. Tables 1 and 2 show example time fractions solving the problem (LP-1) for each of Channels 1 and 2. In this example, to support the example rate requirements shown in FIG. 6, for example, MODE 1, MODE 2, MODE 4 and MODE 10 may be selected from the candidate modes for Channel 1 shown in FIG. 7, and MODE 12 may be selected from the candidate modes for channel 2 shown in FIG. 8. The aggregate flows on each link achieve the required rates shown in FIG. 6, and the mode selections satisfy the link routing constraint given by Equation (2) (e.g., total utilization of a channel in and out of a node should be ⅔) and the average node power constraints are satisfied by the resulting flows.

TABLE 1

| Schedules | % of time the mode is on | Capacity (kbps) | Flows Supported |
|---|---|---|---|
| MODE 1 | 29.5% | 16403 (51→52) | 4839 (51→52) |
| MODE 2 | 30% | 2338 (51→53) | 701 (51→53) |
| MODE 4 | 30% | 3865 (52→53) | 1159 (52→53) |
| MODE 10 | 8% | 16403 (51→52) | 1312 (51→52) |
|  |  | 22147 (53→54) | 1772 (53→54) |

TABLE 2

| Schedules | % of time the mode is on | Capacity (kbps) | Flows supported |
|---|---|---|---|
| MODE 12 | 67% | 4809 (51→53) | 3222 (51→53) |
|  |  | 2413 (52→54) | 1617 (52→54) |

After having determined link schedules at step S103, routing paths for each destination node may be determined at step S104. As discussed above, the flow assignment for the f-th channel on link (i,j) is given by $x_{ij}{}^f = a_{ij}{}^f$. According to at least some example embodiments, $a_{ij}{}^f$ may contain traffic for multiple destination nodes, and at least a portion of $a_{ij}{}^f$ may belong to the destination d. This portion may be denoted by $a_{ij}{}^f(d)$, and thus $a_{ij}{}^f$ may be given by Equation (C1) below.

$$a_{ij}^f = \sum_d a_{ij}^f(d) \quad \text{(C1)}$$

As further discussed above, the net throughput delivered to each destination node is denoted by T bps and each source node injects $T_i$ bps, the set of source and sink node indices are denoted by $M_{so}$ and $M_{si}$, respectively, and the set of outgoing and incoming links associated with the node i is denoted by $A_{out}(i)$ and $A_{in}(i)$, respectively. In this example, the equalities shown in Equation (C2) apply for source traffic.

$$\sum_{(i,j) \in A_{out}(i)} \sum_{\forall f} \sum_{\forall d} a_{ij}^f(d) = T_i, \forall i \in M_{so}, \quad \text{(C2)}$$
$$\sum_{(j,i) \in A_{in}(i)} \sum_{\forall f} \sum_{\forall d} a_{ji}^f(d) = 0, \forall i \in M_{so}.$$

For the sink nodes, the routing path constraint shown below in Equation (C3) implies that the sink nodes do not route their own traffic.

$$\sum_{(j,i) \in A_{in}(i)} \sum_{\forall f} a_{ji}^f(i) = T, \forall i \in M_{si}, \quad \text{(C3)}$$
$$\sum_{(i,j) \in A_{out}(i)} \sum_{\forall f} a_{ij}^f(i) = 0, \forall i \in M_{si}$$

The fact that the sink nodes may route each other's traffic is expressed in the routing path constraint shown below in Equation (C4).

$$\sum_{(j,i) \in A_{in}(i)} \sum_f a_{ji}^f(d) = \sum_{(i,j) \in A_{out}(i)} \sum_f a_{ij}^f(d), \forall i \ne d, i, d \in M_{si} \quad \text{(C4)}$$

In Equation (C4), the left side denotes the traffic to be routed by the node i belonging to the destination d. The right side denotes the traffic routed. Individual routing paths may be identified by solving a linear feasibility problem subject to the routing path constraints given by Equations (C1)-(C4). That is, for example, to identify individual routing paths, the following linear program may be solved:

find $a = [a_{ij}^f(d)]_{\forall(i,j),f,d}$ (or $\min 0 \times a$)

(C1) − (C4)

$a \geq 0$

Figure 9:
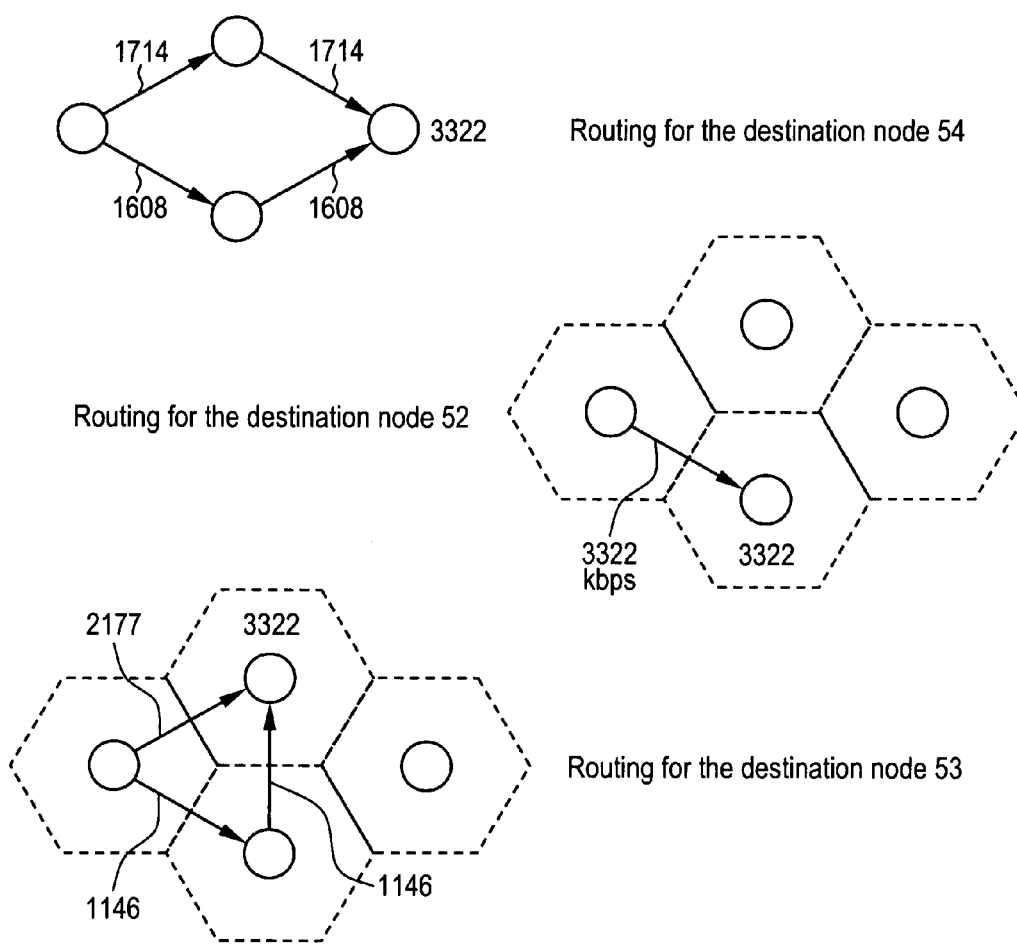
FIG. 9 illustrates example routing paths for destinations shown in FIG. 5.

Referring again to FIG. 5, for this sample network, routing paths for each of the three destinations shown in FIG. 9 satisfy constraints (C1)-(C4), and thus, solve the above linear program. In the example shown in FIG. 9, and $T_1 = 9966$ kbps and $T = 3322$ kbps.

Figure 10:
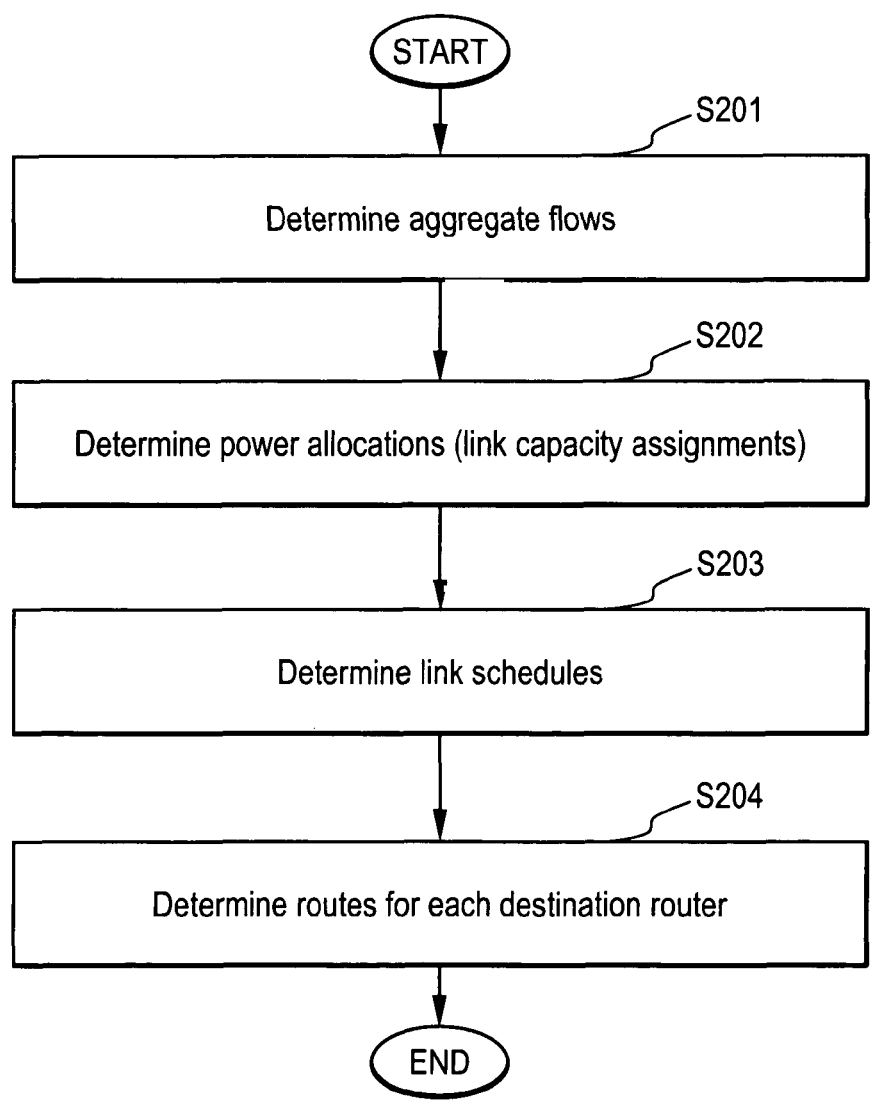
FIG. 10 is a flow chart illustrating a method according to another example embodiment.

FIG. 10 is a flow chart illustrating a method according to another example embodiment. As was the case with regard to FIG. 3, the method shown in FIG. 10 may be applicable to the network described in FIGS. 1 and 2.

Referring to FIG. 10, at step S201, aggregate flows may be determined in manner similar to the manner described above with regard to FIG. 3, except that Equation (8) may be used instead of Equation (3). That is, for example, a linear program may be used to determine aggregate flows maximizing T subject to link routing constraints represented by Equations (4)-(7) above and Equation (8) shown below. In this example embodiment, Equation (8) approximates Equation (3) using $\log(1+x) \sim x$.

$$\sum_{(i,j) \in A_{out}(i)} \sum_{\forall f} \frac{x_{ij}^f}{W(\log_2(e))h_{ij}^f} \leq P, \forall i \in M \quad (8)$$

At step S202, link capacity may be assigned to each link. For example, minimum link powers sufficient to achieve a feasible link schedule may be determined using Equation (9).

$$\min \sum_{(i,j) \in A} \sum_{\forall f} p_{ij}^f \quad (9)$$

s.t. $\sum_{(i,j) \in A_{out}(i)} \frac{1}{p_{ij}^f} \frac{x_{ij}^f}{W(\log_2(e))h_{ij}^f} +$ $\sum_{(j,i) \in A_{in}(i)} \frac{1}{p_{ji}^f} \frac{x_{ij}^f}{W(\log_2(e))h_{ij}^f} \leq \beta$, $p_{ji}^f \geq 0, \forall i \in M, \forall f$ Equation (9) is a geometric optimization problem that may be transformed to a simple convex optimization problem after a logarithmic change of variables.

At steps S203 and S204, the scheduling and routing may be determined in the same manner as discussed above with regard to steps S103 and S104, respectively.

Figure 11:
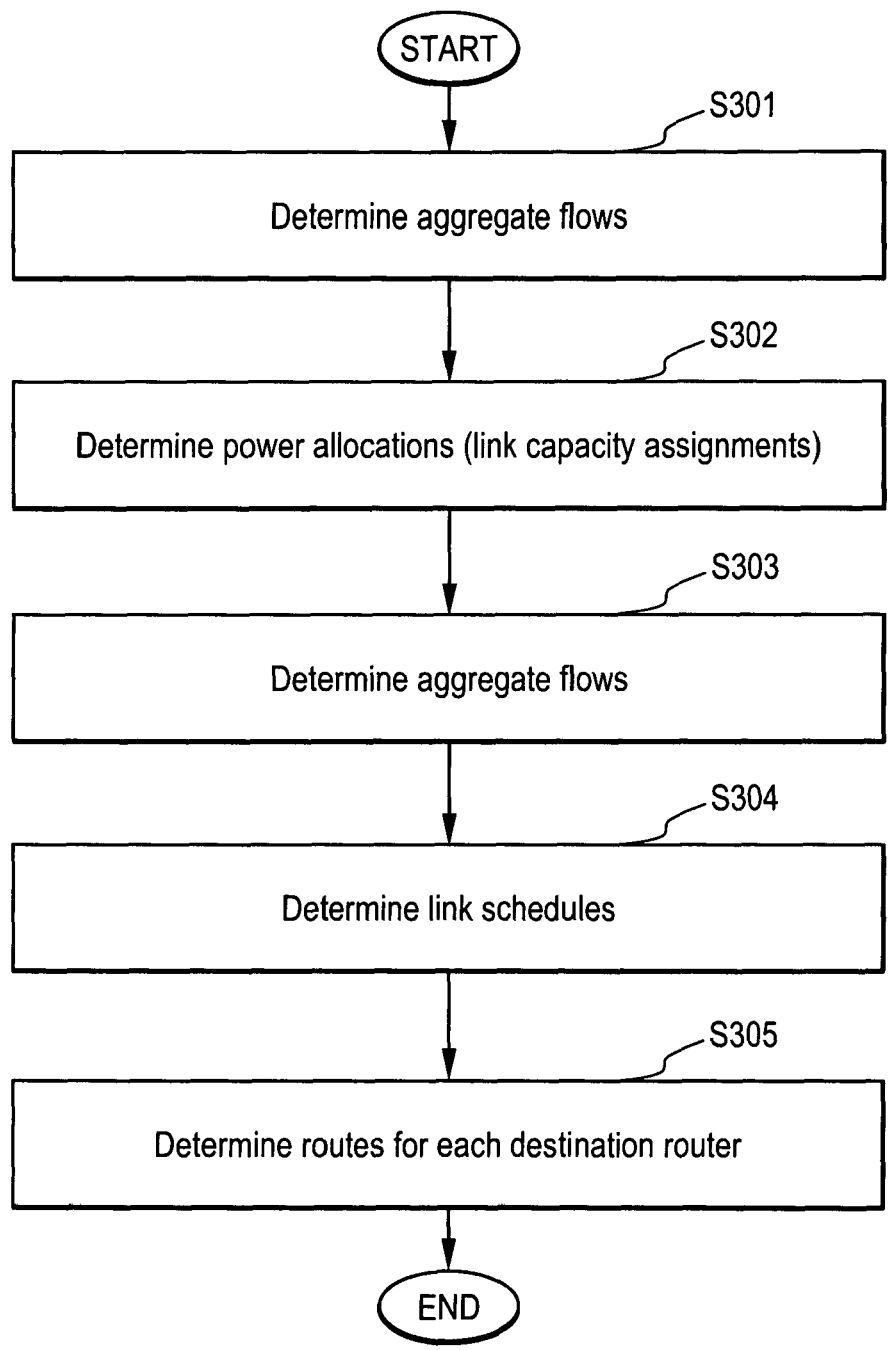
FIG. 11 is a flow chart illustrating an example embodiment according to another example embodiment.

FIG. 11 is a flow chart illustrating a method according to another example embodiment. In this example embodiment, steps S301 and S302 may be the same or substantially the same as steps S201 and S202 described above with regard to FIG. 5.

At step S303, the set of transmission powers $p_{ij}^f$ determined at step S302 may be used to determine the set of achievable rates $C_{ij}^f$. The set of achievable rates $C_{ij}^f$ may then be used to solve the linear program described with regard to step S102 in FIG. 3. That is, for example, these achievable rates $C_{ij}^f$ may be used to solve the linear program maximizing T subject to the link routing constraints given by Equations (2)-(7). At step S304 and S305, scheduling and routing may be determined in the same or substantially the same manner as described with regard to steps S103 and S104 of FIG. 3.

Figure 12:
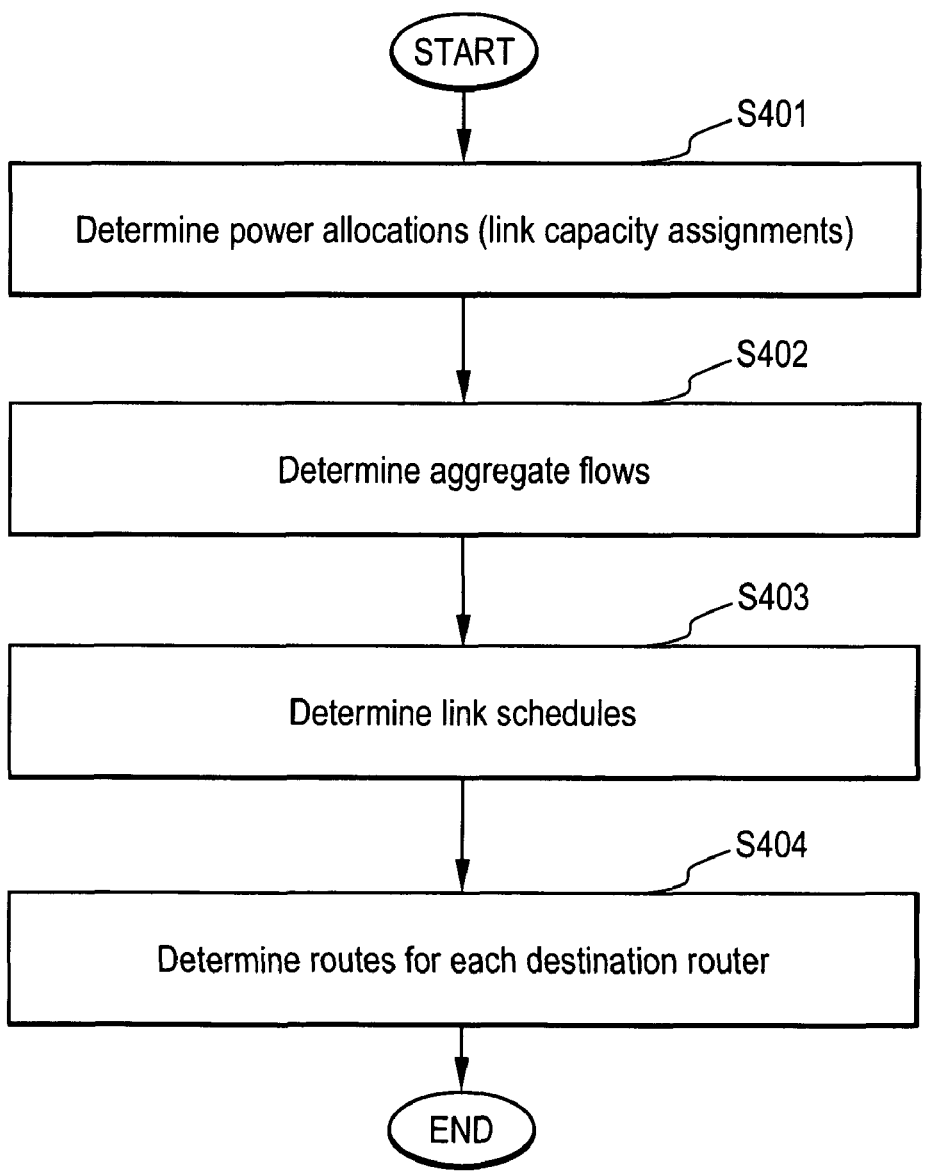
FIG. 12 is a flow chart illustrating a method according to another example embodiment.

FIG. 12 is a flow chart illustrating a method according to another example embodiment. Referring to FIG. 12, steps S401, S403 and S404 may be the same or substantially the same as steps S101, S103 and S104, respectively. At step S402, however, a linear program may be used to determine the aggregate flows $x_{ij}^f$ that maximize the sum rate metric $\Sigma T^i$ for the link routing constraints given by Equations (2), (3), (4) and (5), and the link routing constraints given by Equations (10) and (11) below, in which $T^i$ represents the traffic for destination node i.

$$\sum_{(j,i) \in A_{in}(i)} \sum_{\forall f} x_{ji}^f - \sum_{(i,j) \in A_{out}(i)} \sum_{\forall f} x_{ij}^f = T^i \quad (10)$$

$$\sum_{i \in M_{so}} T_i = \sum_{j \in M_{si}} T^j \quad (11)$$

Figure 13:
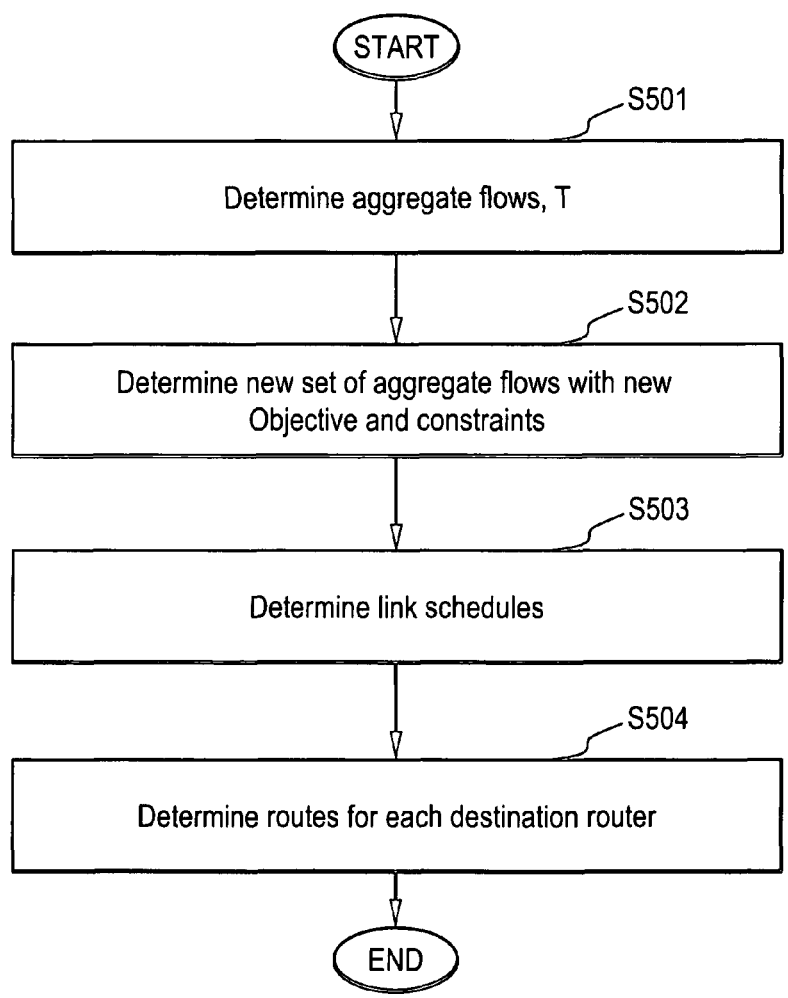
FIG. 13 is a flow chart illustrating a method according to another example embodiment.

FIG. 13 is a flow chart illustrating a method according to another example embodiment. Referring to FIG. 13, at step S501, the aggregate flows $x_{ij}^f$ and the common achieved rate T may be determined in the same manner as described above with regard to FIG. 3. At step S502, a linear program may be used to determine the aggregate flows $x_{ij}^f$ according to an objective function, such as, the sum rate metric $\Sigma T^i$, but subject to the constraints given by Equations (2), (3), (4), (5), (10) and (11), and the constraint given by Equation (12) below.

$$\forall i, T^i \geq T \quad (12)$$

Steps S503 and S504 may be the same or substantially the same as steps S103 and S104, respectively.

According to example embodiments described herein, methods shown in FIGS. 3 and 10-14 may be used to determine at least one link routing characteristic (e.g., link capacity, aggregate flows, link schedules and/or routing paths) for transmitting data between at least two of a plurality of nodes based on at least one desired data throughput characteristic for each source-destination pair selected from the plurality of nodes and a set of link routing constraints (e.g., Equations (2)-(7)) associated with the plurality of nodes, and data may be transmitted between the plurality of nodes using one or more of the determined link routing characteristics. Data may be transmitted using well-known methods for transmitting data over, for example, the above-discussed OFDMA links.

Although discussed herein with regard to linear programs, geometric programs may also be used. Moreover, linear and geometric programs and methods for solving equations using such programs are well-known in the art, for example, as discussed in Stephen Boyd et al., *Convex Optimization*, Cambridge University Press, New York, N.Y., 2004.

The invention being thus described, it will be obvious that the same may be varied in many ways. Such variations are not to be regarded as a departure from the invention, and all such modifications are intended to be included within the scope of the invention.

What is claimed is:

1. A method for transmitting data between a plurality of nodes in a wireless network, the plurality of nodes being interconnected via a plurality of wireless links, the method comprising:

determining at least one link routing characteristic for transmitting data between at least two of the plurality of nodes based on at least one desired data throughput characteristic for each source/destination pair selected from the plurality of nodes and a set of link routing constraints associated with the plurality of nodes; and transmitting data between the plurality of nodes in accordance with the at least one link routing characteristic; wherein the set of link routing constraints includes a per node sum power constraint for each node among the plurality of nodes that are transmitting data, and each per node sum power constraint specifies a constraint on a transmit power at a node among the plurality of nodes that are transmitting data.

2. The method of claim 1, further comprising:
establishing the set of link routing constraints associated with the plurality of nodes based on the at least one data throughput characteristic.

3. The method of claim 1, wherein the at least one link routing characteristic includes at least one of a number of tones allocated to the plurality of wireless links, a transmission power associated with each of the tones, routing paths for each source/destination pair and an amount of source/destination traffic transmitted via each routing path.

4. The method of claim 3, wherein the determining step further comprises:
allocating at least one of a plurality of tones to each of the plurality of wireless links based on the at least one data throughput characteristic.

5. The method of claim 4, wherein the allocating step further comprises:
assigning at least one tone to each of the plurality of wireless links based on a signal to interference plus noise ratio associated with the plurality of wireless links.

6. The method of claim 4, wherein the determining step further comprises:
allocating transmission power to each of the allocated tones based on the at least one data throughput characteristic and a power constraint associated with each of the plurality of nodes.

7. The method of claim 1, wherein the set of link routing constraints include at least one of routing, media access and physical layer constraints.

8. The method of claim 1, wherein the determining step further comprises:
selecting a set of link schedules corresponding to the determined at least one link routing characteristic to achieve the desired data throughput characteristic; and wherein
the transmitting step transmits the data based on the selected link schedules.

9. The method of claim 8, wherein the desired data throughput characteristic is a net traffic flow at each of the plurality of nodes.

10. The method of claim 8, further comprising:
determining routing paths for routing the transmitted data based on the selected link schedules and at least one link routing constraint; wherein
the transmitting step transmits the data via the determined routing paths.

11. The method of claim 1, wherein the per node average sum power constraint is indicative of a length of time for which a node in the plurality of nodes transmits on one of a plurality of tones on one of the plurality of wireless links.

12. The method of claim 1, wherein the determining step further comprises:
determining a set of aggregate flows for transmitting the data based on at least one of the link routing constraints and the desired data throughput characteristic, the desired data throughput characteristic being a desired incoming traffic flow to each destination node; and wherein
the transmitting step transmits the data in accordance with the set of aggregate flows.

13. The method of claim 12, wherein the set of aggregate flows is determined such that the traffic generated by each source node in the plurality of nodes is greater than or equal to the net throughput delivered to each destination node in the plurality of nodes.

14. The method of claim 1, further comprising:
assigning a link capacity to each of the plurality of wireless links based on a set of allocated transmission powers, the transmission powers being allocated based on the at least one desired data throughput characteristic; and wherein
the determining step determines the at least one link routing characteristic based on the assigned link capacity.

15. The method of claim 1, wherein the determining step further comprises:
determining a set of aggregate flows for transmitting the data based on a sum rate metric associated with each destination node, the sum rate metric being indicative of the total traffic flow to the associated destination node; and wherein
the transmitting step transmits the data in accordance with the set of aggregate flows.

16. The method of claim 1, wherein, for each node transmitting data, the per node sum power constraint is based on a transmit power available at the node and a per node aggregate power, the per node aggregate power being a function of a time during which the node transmits on a given channel and a power required to achieve a given transmission rate on the given channel.

17. The method of claim 1, wherein the per node sum power constraint is an independent constraint on the transmit power at each node that is transmitting data such that a total transmit power at each node transmitting data remains less than or equal an available transmit power for that node.

18. A method for transmitting data between a plurality of nodes in a wireless network, the plurality of nodes being interconnected via a plurality of wireless links, the method comprising:
determining at least one link routing characteristic for transmitting data between at least two of the plurality of nodes based on at least one desired data throughput characteristic for each source/destination pair selected from the plurality of nodes and a set of link routing constraints associated with the plurality of nodes;

selecting a set of link schedules corresponding to the determined at least one link routing characteristic to achieve the desired data throughput characteristic;

identifying routing paths for routing the transmitted data based on the selected link schedules and at least one of the link routing constraints; and transmitting data between the plurality of nodes via the identified routing paths; wherein
the set of link routing constraints includes a per node sum power constraint associated with each node among the plurality of nodes that are transmitting data, and
each per node sum power constraint specifies a constraint on a transmit power at a node among the plurality of nodes that are transmitting data.

* * * * *